Patented Aug. 17, 1926.

1,596,590

UNITED STATES PATENT OFFICE.

MELVIN DE GROOTE, OF ST. LOUIS, MISSOURI, ASSIGNOR TO WM. S. BARNICKEL & COMPANY, OF WEBSTER GROVES, MISSOURI, A CORPORATION OF MISSOURI.

PROCESS FOR BREAKING PETROLEUM EMULSIONS.

No Drawing.   Application filed May 29, 1925. Serial No. 33,831.

This invention relates to the treatment of emulsions of a mineral oil and water, such as cut oil, roily oil, bottom settlings and other petroleum emulsions, for the purpose of separating the oil from the water.

Petroleum emulsions of the kind referred to are of the water-in-oil type and consists of droplets of water encased in emulsifying films and dispersed throughout a body of oil that constitutes the continuous phase of the emulsion. They can be broken by subjecting them to the action of various kinds of chemical treating agents, such as those disclosed in United States Patents to William S. Barnickel, No. 1,223,660, dated April 24, 1917 and No. 1,467,831, dated September 11, 1923, the conventional process consisting in subjecting the emulsion to the action of a chemical substance or compound which acts on the emulsion in such a manner that the water of the emulsion will separate from the oil of the emulsion when the emulsion is allowed to remain in a quiescent state, at a suitable temperature, after treatment.

In treating such emulsions it is essential for highly successful results that the treating agent reach the interfaces between the water droplets of the emulsion and the oil in which said droplets are dispersed, in order that the treating agent will act effectively on the emulsifying films that encase the water droplets, and the object of my invention is to secure this desirable result, namely, insure the treating agent being segregated in relatively large quantities at the liquid-liquid interfaces of the emulsion.

To this end I propose to treat a petroleum emulsion of the water-in-oil type with an hydrophobe oil-soluble treating agent characterized by the fact that it is rendered dispersable as a coarse colloid in an oily vehicle, such as gasoline, kerosene or crude oil. Such a process is more effective than the usual process of treating a petroleum emulsion with an oil-soluble hydrophobe treating agent in molecular dispersion, due to the fact that the coarsely colloidal dispersion of the treating agent produces a materially stronger segregation of the treating agent at the liquid-liquid interfaces of the emulsion than can be obtained with a chemical treating agent in molecular dispersion. The dispersion of the colloidal hydrophobe treating agent in oil is especially characterized by the fact that relatively concentrated dispersions of 25-50% strength stay in a rather permanent dispersion, whereas, the weaker strength of 1-5% tend to settle out in a few hours.

I have found that the easiest way to obtain a coarse colloidal dispersion of an oil-soluble treating agent in a vehicle of the kind above mentioned is to add a liquid, such as glycerine, water, etc., ordinarily immiscible with the treating agent before said agent is mixed with the vehicle to produce a suitable dispersion. In so far as the two liquids to be mixed, that is, the agent and the glycerine, water, etc., are relatively immiscible, therefore, an oil soluble emulsifying agent such as calcium, or magnesium oleate will have to be added to the treating agent in order to render mixing or emulsification possible. This liquid, preferably water, is emulsified by any suitable means. The amount of water which I prefer to add varies from 0.5 of 1% to 20% by volume. So far as I have been able to discover, any oil-soluble hydrophobe chemical agent that is capable of use for breaking petroleum emulsions can be improved by the addition of sufficient immiscible liquid or water by the assistance of an emulsifying agent so as to obtain a coarsely colloidal dispersion of said treating agent in the vehicle used. My invention contemplates the use of a hydrated form of hydrophobe oil-soluble treating agent. Of the many suitable forms that can be used, such as naphthenic acids, rosins, fatty acids, etc., its has been found that the modified hydrophobe fatty acids described in the Barnickel Patent No. 1,467,831, dated September 11, 1923, are the most desirable. Such modified fatty acids are obtained by the action of certain chemical reagents on animal, vegetable and marine oils, and in producing such treating agents it has been found that those modifications obtained by a sulphonating agent, especially sulphuric acid on the following oils are most suitable, namely, degras, horse, lard, neatsfoot, oleo, tallow, cod, herring, menhaden, salmon, sardine, sperm, whale, castor, China-wood, cocoanut, corn, cotton seed, linseed, limbang, olive, palm, palm kernel, peanut, perilla, poppy seed, rape seed, sesame, soya bean, tea, red oil, as well as the mixed fatty acids derived from the same or the purified fatty acids such as palmitic, oleic, stearic, ricinoleic, etc. In general, the actual chemical constituents include among other, the following: Sulphonates of fatty acids or sulpho-fatty acids, sulphurized fatty acid, fatty sulphation products, fatty sulphated product, sulpho-oleic acid, sulpho-stearic acid, sulpho-palmitic acid, sulpho-ricinoleic acid, sulpho-hydroxystearic acid, sulpho-iso-oleic acid, sulpho-di-hydroxystearic acid, sulpho-tri-hydroxystearic acid, sulpho-linolic acid, sulpho-lauric acid, fatty sulphonic acid, fatty acid sulphonic acid addition product, oleic sulphonic acid, stearic sulphonic acid, iso-oleic sulphonic acid, hydroxy-stearic sulphonic acid, di-hydroxy sulphonic acid, tri-hydroxystearic sulphonic acid, linolic sulphonic acid, ricinoleic sulphonic acid, lauric sulphonic acid, oleic sulphuric acid addition product, stearic sulphuric acid addition product, iso-oleic sulphuric acid addition product, hydroxystearic sulphuric acid addition product, di-hydroxy sulphuric acid addition product, tri-hydroxystearic sulphuric acid addition product, linolic sulphuric acid addition product, ricinoleic sulphuric acid addition product, lauric sulphuric acid addition product, sulphated oil, Turkey-red oil, alizarine oil, soluble oil, dyeing oil, sulphonation products, fatty acid sulphonates, sulphoricinate, sulphonated oils, primary etheral salts of sulphuric acids, ricinoleic sulphuric acid, di-hydroxystearo-sulphuric acid, di-basic di-ricinoleic acid, monobasic di-ricinoleic acid, di-hydroxystearic acid, iso-ricinoleic acid, glycid acids, saturated lactone, saturated lactide, semi-saturated di-rincinoleic acid, semi-saturated lactone, unsaturated lactide, polyricinoleic acids, oxy-stearic lactone, oleic acid sulphate, hydroxystearic acid, iso-oleic acid, para-oleic, elaidic acid and stearolactone, stearic acid hydrogen sulphate, hydroxystearo-sulphuric acid, sulpho-compound glycerides, hydroxylated fatty acids, hydroxystearic acid, oxy-stearic acid, linolenic sulphonic acid, sulpho-linolenic acid and linolenic sulphuric addition product.

In the manufacture of these products by means of sulphuric acid, it is the usual practice to remove substantially all the sulphuric acid. This is not necessary in order to manufacture a treating compound, because the acidified mass is an active treating agent. However, due to the corrosive effect of acid on the metallic pipe lines, it is usually desirable that the compound as employed be neutral or alkaline. It should be understood that the presence of a small amount of acid does not interfere with the employment of this method of dehydration as contemplated by my invention. The use of sulphuric acid as a treating agent has long been known and its employment in minute quantities has long been the practice where the risk from corrosion was not too great. Employing sulphuric acid in a nascent or an oil-soluble condition, such as its solution, in these treating agents, would be a desirable help.

I have found that hydrated, oil-soluble hydrophobe soaps can be used more advantageously than anhydrous materials, as the emulsifier for the treating agent and the liquid immiscible therewith, and accordingly, in practicing my invention I prefer to use hydrophobe, oil-soluble soap to the amount of about 10 to 20% dissolved in a modified fatty acid with the addition of approximately 2 to 20% of water. Previous reference has been made to the use of a suitable emulsifying agent, in order to obtain a mixture of the hydrophobe, oil-soluble treating agent and water, or other ordinarily immiscible liquid. Therefore, for obvious reasons, it is preferable that the emulsifying agent be the hydrophobe soap of the chemical treating agent, thereby gaining the advantage of the treating action of the soap, instead of an inert emulsifier, such as carbon black or rubber. Due to the stabilizing action of the oil-soluble, hydrophobe soap, the water of the compound will not separate from the treating agent. Consequently, the compound can be manufactured in large quantities and shipped in containers to the point where it is to be used. The compound is best employed by diluting with an equal quantity of kerosene and adding the 50% solution to the emulsion in any of the various ways now employed to bring a chemical treating agent into contact with a petroleum emulsion which it is desired to break, such, for example, as introducing the treating agent into a conduit through which the emulsion is flowing, introducing the treating agent into a tank in which the emulsion is stored, or introducing the treating agent into a producing well in such a way that it can mix with the oil that is emerging from the ground before said oil and the water that emerges from the ground enter the barrel of the well pump or the tubing up through which said water and oil flow to the surface of the ground. After treatment the emulsion is allowed to stand in a quiescent state, at a suitable temperature, so as to permit the water of the emulsion to separate from the oil of the emulsion. If desired, the emulsion con be subjected to the action of a treating agent of the kind above described, then passed through a hay tank, gun barrel or through a centrifugal or electrical dehydrator, and then allowed to stand in a quiescent state. The aromatic fatty acid compounds of the above materials, as disclosed in the Barnickel Patent No. 1,467,831, previously referred to, are also suitable for this process. Generally, a mixture of two or more of the above materials is used.

While I prefer to use a relatively concentrated solution, such as a solution of 25% to 50% strength, my improved treating agent is characterized by its ability to form a coarsely-dispersed colloidal state, in dilute oil solution, and advantage of this property can be taken by using the treating agent directly, without intermediate solution, for treating the emulsion, in so far as it disperses in the continuous or oil phase of the emulsion.

In instances where the treating agent that is used consists simply of a modified fatty acid mixed with a small quantity of water, it is often necessary to add to the compound a material such as carbon black, asphalts, etc., so as to prevent the water of the compound from separating. When such a stabilizing material is added the carbon black is first mixed with the modified fatty acid, and thereafter a small quantity of water is added to this mixture, the carbon black serving to effectively prevent the water from separating before the compound is mixed with kerosene or any other suitable diluent to produce a treating solution.

Having thus described my invention, what I claim as new and desire to secure by Letters Patent is:—

1. A process for treating water-in-oil emulsions, characterized by subjecting the emulsion to the action of an hydrophobe oil-soluble treating agent in which has been combined by the agency of a suitable emulsifier, a liquid that is immiscible with said treating agent.

2. A process for treating water-in-oil emulsions, characterized by subjecting the emulsion to the action of an hydrophobe oil-soluble treating agent in which has been combined water by the agency of a suitable emulsifier.

3. A process for treating water-in-oil emulsions, characterized by subjecting the emulsion to the action of an hydrophobe oil-soluble treating agent in which has been combined by the agency of an hydrophobe soap a liquid that is immiscible with said treating agent.

4. A process for treating water-in-oil emulsions, characterized by subjecting the emulsion to the action of an hydrophobe oil-soluble treating agent in which has been combined water by the agency of an hydrophobe soap.

5. A process for treating water-in-oil emulsions, characterized by subjecting the emulsion to the action of an hydrophobe oil-soluble, modified fatty acid, which bears a simple genetic relationship to the parent material from which it was derived and in which has been combined by the agency of a suitable emulsifier, a liquid that is immiscible with said acid.

6. A process for treating water-in-oil emulsions, characterized by subjecting the emulsion to the action of an hydrophobe oil soluble modified fatty acid, which bears a simple genetic relationship to the parent material from which it was derived and in which has been combined water by the agency of a suitable emulsifier.

7. A process for treating water-in-oil emulsions, characterized by subjecting the emulsion to the action of an hydrophobe oil-soluble modified fatty acid, which bears a simple genetic relationship to the parent material from which it was derived and in which has been combined by the agency of an hydrophobe soap, a liquid that is immiscible with said acid.

8. A process for treating water-in-oil emulsions, characterized by subjecting the emulsion to the action of an hydrophobe oil-soluble modified fatty acid, which bears a simple genetic relationship to the parent material from which it was derived and in which has been combined water by the agency of an hydrophobe soap.

MELVIN DE GROOTE.